United States Patent [19]

Raver

[11] 3,962,621

[45] June 8, 1976

[54] DUAL BATTERY CHARGING GENERATOR SYSTEM

[75] Inventor: Louis J. Raver, Anderson, Ind.

[73] Assignee: General Motors Corporation, Detroit, Mich.

[22] Filed: Jan. 16, 1975

[21] Appl. No.: 541,624

Related U.S. Application Data

[62] Division of Ser. No. 406,701, Oct. 15, 1973, Pat. No. 3,863,127.

[52] U.S. Cl. ................................. 320/15; 320/61; 307/16; 322/28
[51] Int. Cl.² ........................................... H02J 7/14
[58] Field of Search .............. 320/15, 17, 61, 46, 320/6; 310/68 D; 307/16; 322/28, 90

[56] References Cited
UNITED STATES PATENTS

| | | | |
|---|---|---|---|
| 2,453,960 | 11/1948 | Arvidsson | 320/15 |
| 2,567,476 | 9/1951 | Hamilton | 322/28 |
| 3,041,484 | 6/1962 | Freer et al. | 310/68 |
| 3,206,610 | 9/1965 | Lovrenich | 320/17 |
| 3,316,416 | 4/1967 | Carlson | 307/17 |
| 3,555,395 | 1/1971 | Beery | 320/6 X |
| 3,667,025 | 5/1972 | Campbell et al. | 320/15 |
| 3,671,843 | 6/1972 | Huntzinger et al. | 320/15 |
| 3,710,226 | 1/1973 | Seike | 320/15 |
| 3,809,995 | 5/1974 | Hardin | 320/17 X |
| 3,816,805 | 6/1974 | Terry | 320/15 |

*Primary Examiner*—Mark O. Budd
*Assistant Examiner*—Robert J. Hickey
*Attorney, Agent, or Firm*—C. R. Meland

[57] ABSTRACT

A battery charging generator which is capable of charging two series connected batteries in a motor vehicle electrical system where the series connected batteries are used to energize the cranking motor of a motor vehicle. The generator is of the alternating current type and has first and second three-phase full-wave bridge rectifier units built into the end frame of the generator each of which is capable of supplying charging current to one of the batteries. The generator has a built-in transistor voltage regulator which senses the voltage applied to the main battery of the system by the first bridge rectifier and which regulates the output voltage of the generator to a predetermined value. The second bridge rectifier supplies charging current to an auxiliary battery and is connected with the stator winding of the alternating current generator by means of a three-phase transformer. The transformer, like the bridge rectifiers, is built into the end frame of the generator and isolates the two bridge rectifiers of the system. The generator is arranged with a 12 volt and a 24 volt output terminal which only need be connected directly to the batteries when installing a generator on a motor vehicle.

2 Claims, 5 Drawing Figures

DUAL BATTERY CHARGING GENERATOR SYSTEM

This application is a division of copending application Ser. No. 406,701, filed on Oct. 15, 1973 and now U.S. Pat. No. 3,863,127.

This invention relates to a battery charging generator and more particularly to a single unit diode-rectified alternating current generator which is capable of developing two direct voltage outputs which are utilized to charge a pair of storage batteries.

The motor vehicle electrical systems of certain vehicles such as large over the highway trucks, utilize a 24 volt cranking motor to crank the engine. In order to charge the batteries of such a system and to provide proper cranking motor voltage, it has been common practice to use a series-parallel switch in conjunction with a battery charging generator and a cranking motor. The series-parallel switch connects two 12 volt batteries in parallel and across the charging generator when it is desired to charge the batteries and connects the batteries in series to provide 24 volts for energizing the cranking motor when it is desired to crank the engine.

In order to eliminate the series-parallel switch it has been proposed to arrange a system where a conductor maintains a series connection between the batteries, such that the cranking motor can be energized whenever a switch connects the series connected batteries and the cranking motor. In order to charge the batteries, systems of this type have employed an auxiliary circuit for charging one of the batteries. An example of this type of system is disclosed in the U.S. Pat. to Huntzinger et al., No. 3,671,843 in which one of the batteries is charged from a converter which has a rectified output that is used to charge the battery.

In contrast to the systems that have been described, the present invention contemplates providing a single-unit diode-rectified alternating current generator which is provided with direct current output terminals that can be utilized to respectively charge two series-connected 12 volt batteries that are capable of energizing a 24 volt cranking motor. The battery charging generator of this invention rather than utilizing auxiliary external apparatus uses the three phase output winding of the generator to charge both batteries. The alternating current generator has a frame which supports a pair of three phase full-wave bridge rectifier units. One of the bridge rectifier units has its A.C. input terminals connected directly with the three-phase output winding of the generator and this bridge rectifier unit has direct current output terminals which are utilized to charge the battery that supplies the normal electrical loads on the vehicle. The other three-phase full-wave bridge rectifier unit is connected to the three-phase output winding of the generator through a three-phase transformer which is also built into the end frame of the generator. The transformer has a substantially 1:1 turns ratio and effectively isolates the two bridge rectifiers. The second bridge rectifier has direct current output terminals which are utilized to charge the auxiliary 12 volt battery for the electrical system.

It accordingly, is one of the objects of this invention to provide a single unit diode-rectified alternating current generator which has direct current output terminals that can be connected with two series-connected storage batteries to provide charging current for the storage batteries and wherein the system includes a built-in transformer for isolating the two rectifier units from each other.

Another object of this invention is to provide a dual battery charging generator of the type described where the generator has a built-in transistor voltage regulator which senses the direct voltage output of the bridge rectifier that supplies charging current to the main battery of the system that supplies the normal electrical loads on the motor vehicle and wherein the system operates such that this regulator also controls the output voltage of the rectifier that supplies charging current to the auxiliary battery.

Still another object of this invention is to provide a dual voltage diode-rectified alternating current generator wherein a pair of bridge rectifier units are built into the end frame of the generator and wherein the bridge rectifier units are substantially aligned with each other so as to provide a compact unit that is easily electrically connected with both the stator winding of the generator and a transformer which feeds the bridge rectifier unit that is used to charge the auxiliary battery.

Another object of this invention is to provide a dual battery charging system of the type described wherein the turns ratio of the transformer is of such a value as to aid in preventing overcharging of the auxiliary battery during operation of the system.

IN THE DRAWINGS

Figure 1:
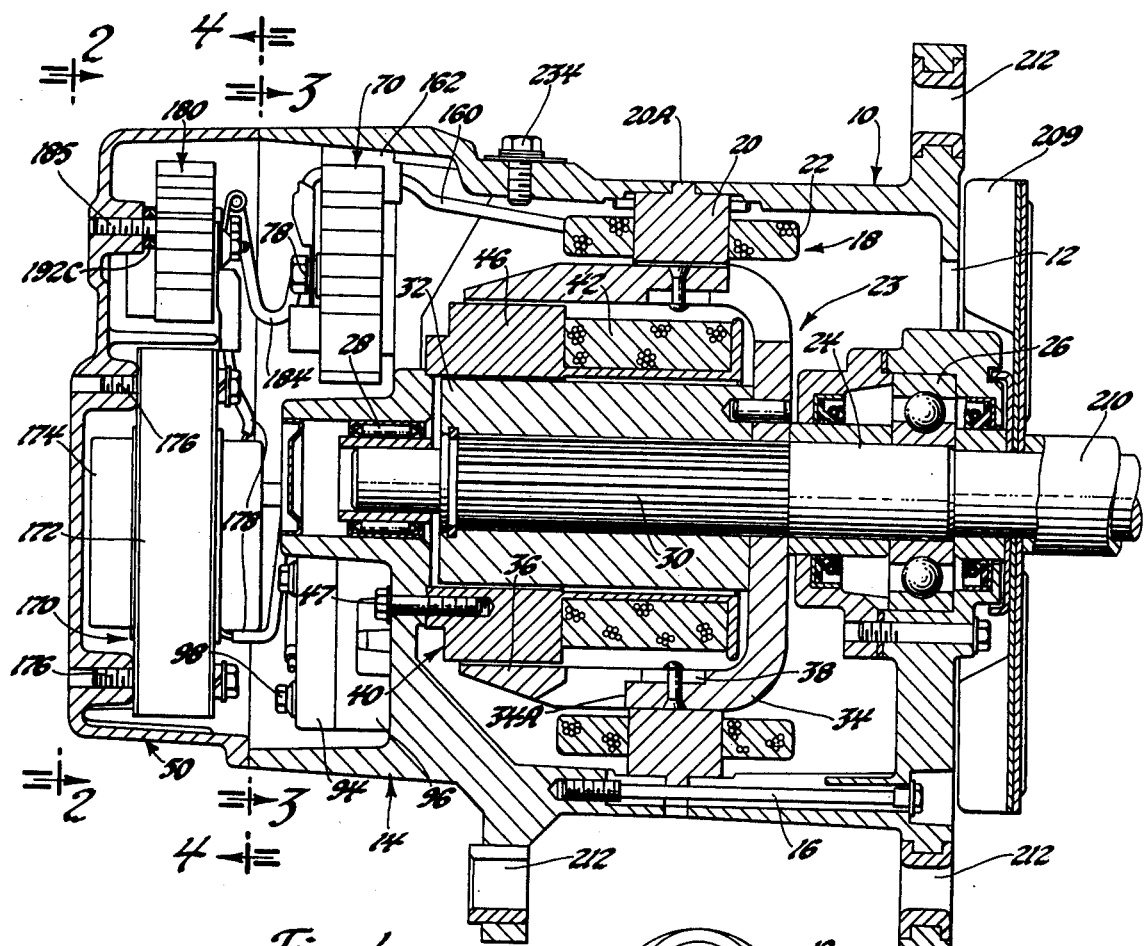
FIG. 1 is a sectional view of a dual voltage diode rectified alternating current generator made in accordance with this invention.
Figure 2:
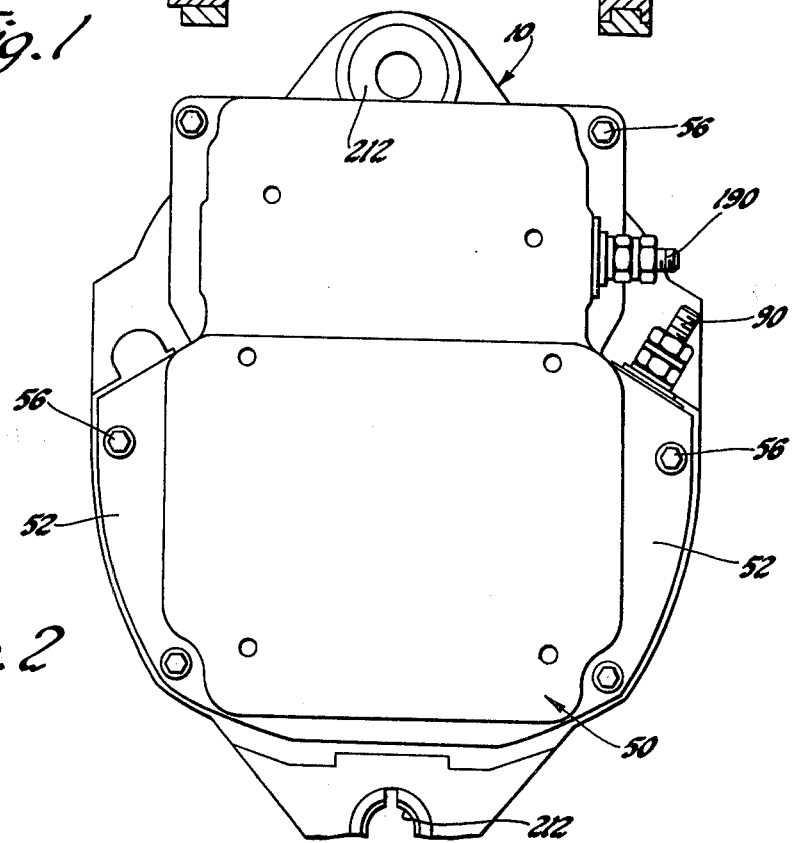
FIG. 2 is an end view of the generator shown in FIG. 1 looking in the direction of the arrows 2—2 of FIG. 1.
Figure 5:
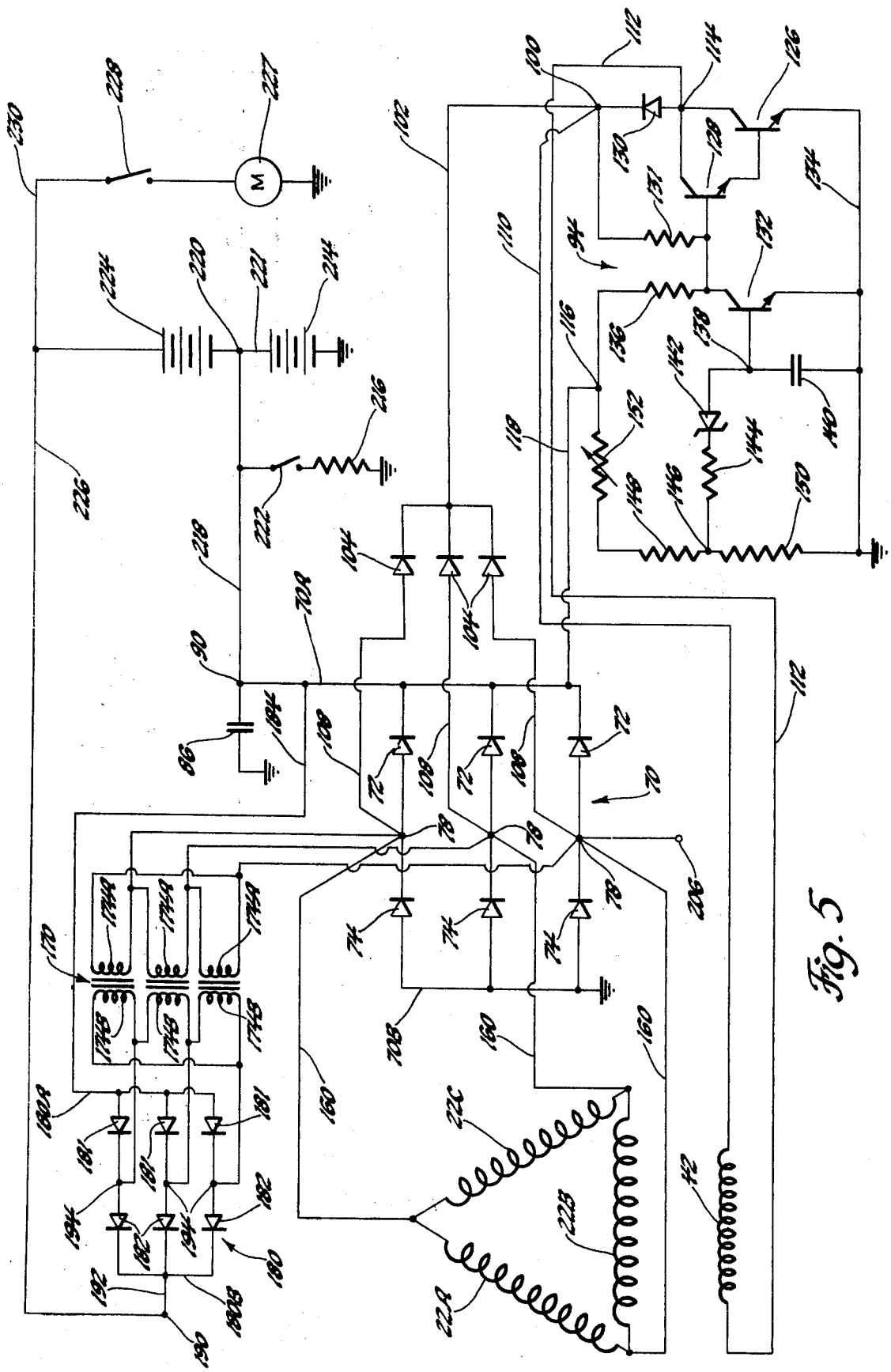
FIG. 5 is a schematic circuit diagram of the complete electrical system of the diode-rectified alternating current generator of this invention.

Referring now to the drawings and more particularly to FIG. 1, the reference numeral 10 designates the end frame of the battery charging generator made in accordance with this invention. This end frame is formed of a metallic material such as die cast aluminum. The end frame 10 is generally tubular and has air outlet openings designated by reference numeral 12. The generator of FIG. 1 has another substantially tubular end frame designated by reference numeral 14 which may also be formed of aluminum material. The end frames 10 and 14 are secured together by a plurality of through bolts, one of which is shown in FIG. 1 and designated by reference numeral 16. The end frames 10 and 14 support a stator assembly generally designated by reference numeral 18. The stator assembly 18 includes a core 20 formed of magnetic material having an annular portion 20A which is clamped between end frames 10 and 14. The annular core 20 has the usual stator slots and these slots carry a three phase delta-connected stator winding designated by reference numeral 22 and shown schematically in FIG. 5. In FIG. 5 the phase windings of the stator or output windings of the generators have been designated by reference numerals 22A, 22B and 22C.

The frame parts 10 and 14 rotatably support a rotor for the alternating current generator which is generally designated by reference numeral 23. The rotor assembly 23 includes a shaft 24 which is supported in bearings 26 and 28 that in turn are supported by parts of the frames 10 and 14. The shaft 24 has a splined section 30 which carries an annular core member designated by reference numeral 32 that is formed of magnetic material. The core part 32 drives a rotor segment or pole member designated by reference numeral 34. The rotor segment 34 has a plurality of circumferentially spaced axially extending teeth 34A which are interleaved with the teeth of another rotor segment designated by reference numeral 36. The segments 34 and 36 are connected together by an annular non-magnetic part designated by reference numeral 38 which is riveted or otherwise secured to the segments and the arrangement is such that the pole or segment 34 drives the part 36 through the non-magnetic part 38. The two rotor segments form a well-known Lundell type of rotor of the same type as disclosed in the U.S. Pat. to Raver No. 3,271,601.

The rotor segments 34 and 36 rotate about an annular field coil assembly generally designated by reference numeral 40. This field coil assembly includes the field coil 42 and a core member formed of magnetic material designated by reference numeral 46. The core member 46 is supported by a part of the end frame 14 and is secured thereto by fasteners 47.

The alternating current generator as has been thus far described, is the well-known brushless Lundell type disclosed in the U.S. Pat. to Raver No. 3,271,601. Thus, when the field coil 42 is energized with direct current and when the rotor segments 34 and 36 are rotated relative to the stator assembly 18 and the fixed coil assembly 40, an alternating current is generated in the delta-connected stator winding 22.

The particular form of the alternating current generator forms no part of this invention and this generator can take various configurations as long as an alternating current is generated in the stator winding 22 as the shaft is driven.

Figure 3:
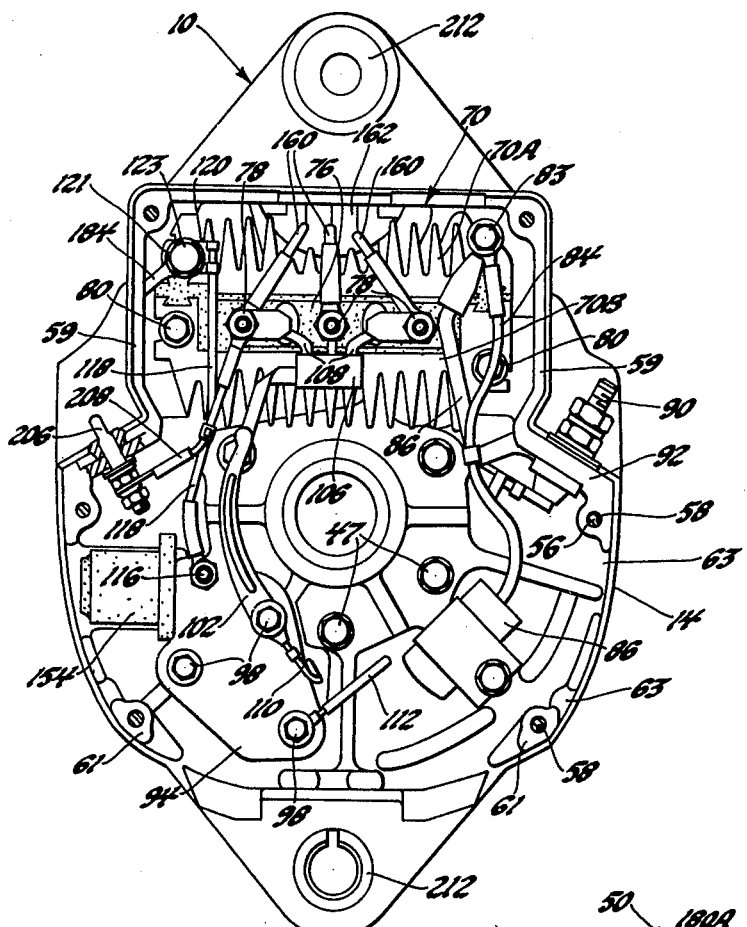
FIG. 3 is a view of the generator shown in FIG. 1 taken along lines 3—3 of FIG. 1.

Attached to the open end of the frame or housing 14 is a metallic housing designated by reference numeral 50. The housing 50 has a flange section 52 formed with a plurality of openings 54 which receive bolts 56 for securing the housing 50 to the frame part 14. The bolts 56 are threaded into threaded openings 58 formed in the housing 14. The threaded openings 58 are formed in the flat end walls 59 and portions 61 of the frame 14 as can be seen in FIG. 3. The flange section 52 of housing 50 mounts flat against end walls 59 and portions 61 when housing 50 is secured to frame 14. It can be seen from FIG. 3 that the end walls 59 and portions 61 do not form a continuous wall for engaging flange section 52. Thus, at a plurality of areas designated by reference numeral 63 the frame 14 is axially spaced from flange section 52 of housing 50 to form air inlet openings for the generator.

The housing or frame 14 contains a three-phase full-wave bridge rectifier assembly which is generally designated by reference numeral 70. This bridge rectifier assembly as is best illustrated in FIG. 3, is comprised of a pair of finned aluminum heat sinks designated by reference numeral 70A and 70B. The heat sink 70A carries three silicon diodes which are not illustrated. These diodes have their cathodes electrically connected to the heat sink 70A and these diodes are designated by reference numeral 72 in the schematic circuit diagram of FIG. 5. The heat sink 70B likewise carries three silicon diodes which are not illustrated in FIG. 3 but which are identified by reference numeral 74 in FIG. 5. The heat sinks 70A and 70B are secured to each other by a suitable insulating material designated in its entirety by reference numeral 76. The bridge rectifier assembly 70 has three A.C. input terminals designated respectively by reference numeral 78. These A.C. input terminals are threaded terminals supported by the insulating material of the rectifier assembly and each A.C. input terminal is connected respectively with the anode and cathode of a respective silicon diode 72 and 74. The diodes of bridge rectifier assembly 70 can be supported in a manner disclosed in the U.S. Pat. Nos. to Christman et al., 3,697,814 or Cheetham et al., 3,538,362.

It will be appreciated by those skilled in the art that the bridge rectifier unit 70 comprises two finned aluminum heat sinks which are electrically insulated from each other and which each carry three silicon diodes forming a three-phase full-wave bridge rectifier unit. The positive and negative direct current output terminals of the bridge rectifier unit are respectively the heat sinks 70A and 70B and these heat sinks have been identified in the same manner in the circuit diagram of FIG. 5.

The bridge rectifier unit 70 is secured to the interior of the frame 14 by the screws or bolts 80 which pass through the slots formed in heat sink 70B and which are threaded into suitable openings formed in bosses in an interior wall of frame 14. The heat sink 70B is electrically connected to the frame 14 and therefore is at ground potential as is indicated in the schematic circuit diagram of FIG. 5.

The heat sink 70A has a threaded opening which receives a screw designated by reference numeral 83. The screw 83 serves to electrically connect apertured spade connectors on conductors 84 and 86 with the heat sink 70A and these conductors are therefore at the positive potential of the bridge rectifier 70. The conductor 84 is connected to one side of capacitor 86. The opposite side of the capacitor 86 is supported by the frame 14 and therefore is at ground potential as is illustrated in FIG. 5.

The conductor 86 is electrically connected with a terminal stud designated by reference numeral 90. The terminal stud 90 passes through a suitable opening formed in the wall portion 92 of the housing 14. The stud 90 is electrically insulated from the housing 14 and forms one of the direct current output terminals for the charging generator of this invention. As seen in FIG. 5, the terminal stud 90 is utilized to supply charging current to one of the batteries in the dual battery system. The direct voltage appearing between terminal stud 90 and ground, as will become more readily apparent hereinafter, is used for charging the main 12 volt battery of the electrical system.

The housing 14 in addition to containing the bridge rectifier unit 70 contains a voltage regulator which is generally designated by reference numeral 94. The voltage regulator is of a transistor type and its physical construction can be the same as that disclosed in the U.S. Pat. to Cheetham et al., No. 3,538,362. The voltage regulator 94 is secured to a heat-sink section 96 of frame 14 by a plurality of screws designated by reference numeral 98 that pass through openings formed in the voltage regulator 94 and which are threaded into the portion 96 of frame 14. The openings in the regulator 94 are circumscribed by annular electrical connectors for the regulator as disclosed in the above mentioned Cheetham et al. patent.

It can be seen from the schematic circuit diagram of FIG. 5 that the junction 100 of the voltage regulator 94 is connected with a conductor 102 which is also illustrated in FIG. 3. The conductor 102 is actually a strip of metallic material connected to the cathodes of three diodes 104. One end of conductor 102 has an opening that receives one of the screws 98. The diodes 104 are contained within a housing designated by reference numeral 106 in FIG. 3. The diodes are connected with apertured conductors 108 illustrated in FIGS. 3 and 5 which are slipped over the terminals 78 that form the A.C. input terminals of the bridge rectifier unit 70. The diodes 104 therefore are contained in a suitable housing which has conductors 108 extending therefrom and these diodes are connected as shown in FIG. 5.

The junction or terminal 100 of voltage regulator 94 is connected with another conductor which is designated by reference numeral 110 in the schematic circuit diagram of FIG. 5. This connection is made by an apertured connector connected to conductor 110 that receives a screw 98. The conductor 110 is shown in FIG. 3 and this conductor is connected to one side of the field winding 42 of the alternating current generator. The opposite side of the field coil 42 is connected with a conductor 112 which in turn is connected to a junction 114 of the voltage regulator 94 by a connector receiving a mounting screw 98. Both conductors 110 and 112 are illustrated in FIG. 3, it being understood that they pass through the frame 14 and are electrically connected to opposite ends of the field coil 42.

The voltage regulator 94 has another terminal designated by reference numeral 116. The terminal 116 is electrically connected to the positive side of the bridge rectifier 70A by a conductor 118 which is illustrated in the schematic circuit diagram of FIG. 5 and also in FIG. 3. As seen in FIG. 3, the conductor 118 is connected to an apertured terminal clip 120 which in turn is fixed and electrically connected to the heat sink 70A by a screw 123 that is threaded into heat sink 70A.

The voltage regulator 94 can be of various circuit configurations one of which is illustrated in FIG. 5. As seen in FIG. 5, the regulator is of the transistor type and comprises a pair of NPN transistors 126 and 128. The transistors 126 and 128 are connected in the known Darlington configuration and the collector-emitter circuit of transistor 126 is connected between one side of the field winding 42 and ground. The field winding 42 is shunted by a field discharge diode 130. A resistor 131 is connected between junction 100 and the base of transistor 128. The voltage regulator 94 further includes a driver transistor designated by reference numeral 132. The driver transistor 132 has its emitter connected to ground at conductor 134 and has its collector connected with resistor 136. The opposite side of resistor 136 is connected with junction 116. The base of transistor 132 is connected to a junction 138. A capacitor 140 is connected between junction 138 and ground. The junction 138 is connected with a Zener diode 142 which is connected in series with a resistor 144. The opposite side of resistor 144 is connected with a junction 146 located between voltage dividing resistors 148 and 150. A resistor 152 is connected between junction 116 and the resistor 148 and has been illustrated in FIG. 5 as a variable resistor. In a preferred form, the variable resistance 152 is provided by a voltage adjusting arrangement of the type which is disclosed in the U.S. Pat. to Alexander et al., No. 3,659,188. Thus, as shown in that patent, the projecting terminals of the voltage regulator 94 (not illustrated) are fitted with an insulated connector which is designated by reference numeral 154 in FIG. 3. The connector 154 fits within an opening formed in the frame 14 and is adapted to receive a voltage adjustment cube formed of a plurality of resistors of the type illustrated in the above mentioned Alexander et al. patent and not disclosed herein. This voltage adjustment feature forms no part of the present invention and can take other forms if so desired.

Referring now to FIG. 3, it is seen that the input terminal studs 78 of the bridge rectifier 70 are electrically connected with apertured spade connectors connected to conductors 160. The conductors 160 as illustrated in FIGS. 1 and 5, are electrically connected to the stator winding 22 of the alternating current generator. It can be seen from FIG. 3 that the conductors pass through a slitted rubber grommet 162 located between heat sink 70A and an inner wall of the housing 14. All of the connector terminals that are slipped on terminals 78 are held in place by nuts illustrated in FIG. 3.

Figure 4:
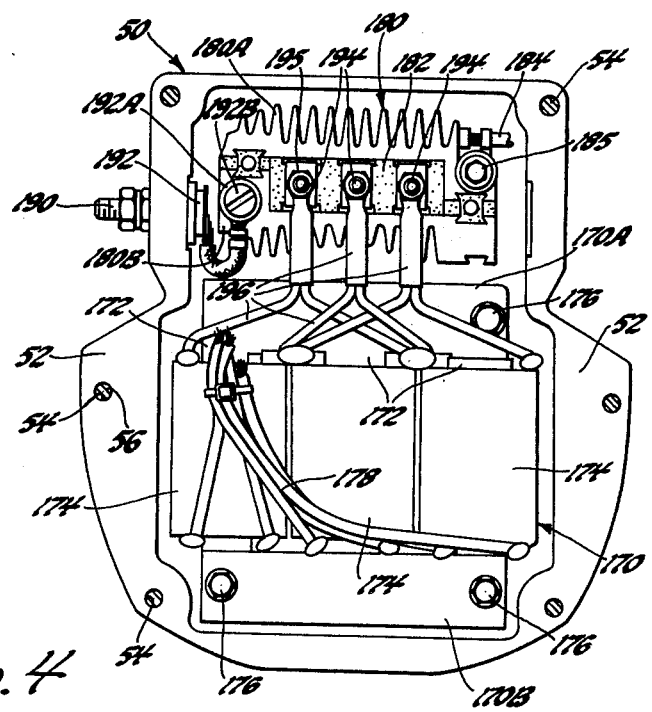
FIG. 4 is a view of the generator shown in FIG. 1 taken along lines 4—4 of FIG. 1.

The housing 50 which is secured to housing 14 carries a three-phase delta-connected transformer generally designated by reference numeral 170 in FIG. 5. The transformer 170 (FIG. 4) includes a core formed of magnetic material having end sections 170A and 170B and three legs 172 which carry the coil windings 174. The coil windings 174 include the primary and secondary phase windings of the transformer and in the schematic circuit diagram of FIG. 5 the primary phase windings have been designated by reference numeral 174A whereas the secondary phase windings are designated by reference numeral 174B. It is to be understood that the primary and secondary windings are wound on the respective legs 172 of the core of the transformer as shown in FIG. 4. The magnetic core member of the transformer 174 is bolted to the inner wall of the housing 50 by suitable screws or fasteners designated by reference numeral 176 that are threaded into housing 50. It can be seen from the schematic circuit diagram of FIG. 5 that the primary windings 174A of the transformer 170 are connected with the A.C. input terminals 78 of bridge rectifier 70 and they are therefore electrically connected to the stator winding 22 of the generator. The physical connection of the primary windings 174A with the terminal studs 78 is made through conductors designated in their entirety by reference numeral 178 and illustrated in FIG. 4. The terminal connectors on conductors 178 have not been illustrated but it is understood that the connectors have openings receiving studs 78 and are connected thereto. From the foregoing, it can be seen that the primary windings of the transformer 170 are delta-connected to the A.C. input terminals 78 of the bridge rectifier 70 by way of conductors 178 extending from the lower side of the transformer 170 up to the terminals 78.

Disposed within the housing 50 is another three-phase full-wave bridge rectifier unit generally designated by reference numeral 180 which is best illustrated in FIG. 4. The bridge rectifier unit 180 is like that shown in the above mentioned U.S. Pat. to Christman et al., No. 3,697,814. Thus, the bridge rectifier unit 180 comprises finned aluminum heat sinks 180A and 180B as illustrated in FIG. 4. These aluminum heat sinks are supported and insulated from each other by insulating material generally designated by reference numeral 182. The heat sink 180A as shown schematically in FIG. 5, forms the negative direct current output terminal for the bridge rectifier unit 180. The heat sink 180A carries three silicon diodes designated by reference numeral 181 in FIG. 5 which have their anodes connected to the heat sink 180A in a manner disclosed in the above mentioned Christman et al. patent. In a similar manner, the heat sink 180B carries three silicon diodes 182 which have their cathodes electrically connected to the heat sink 180B. The heat sink 180B forms the positive output terminal for the bridge rectifier unit 180 while the heat sink 180A forms the negative direct current output terminal for the bridge rectifier 180. The negative terminal or heat sink 180A is electrically connected with a conductor 184 (FIG. 4) by a screw 185 passing through a connector on conductor 184 and through a mounting slot formed in heat sink 180A. The screw 185 is threaded into housing 50 and is insulated from heat sink 180A. The opposite end of conductor 184 is electrically connected with the heat sink 70A by apertured terminal 121 connected to conductor 184 and held in place by screw 123 (see FIG. 3). It thus is seen that the conductor 184 serves to directly electrically connect the heat sink 180A of bridge rectifier unit 180 with the heat sink 70A of bridge rectifier unit 70. This is also illustrated in the schematic circuit diagram of FIG. 5.

The positive heat sink 180B of bridge rectifier unit 180 is electrically connected with a terminal stud 190 by a conductor 192. The conductor 192 is attached to an apertured terminal 192A which receives a screw 192B that passes through an opening in heat sink 180B. The screw 192B is threaded into the housing 50 and with screw 185 serves to secure the rectifier unit 180 to housing 50. The rectifier unit 180 is insulated from the frame 50 by insulation including insulator 192C. The terminal stud 190 extends through one side wall of the housing 50 and is electrically insulated from the housing. The terminal stud 190 is illustrated as a terminal in the schematic circuit diagram of FIG. 5.

The bridge rectifier unit 180 has three threaded terminal studs designated by reference numeral 194 connected to diodes 181 and 182 in a manner shown in the above mentioned Christman et al. patent. These terminal studs 194 form A.C. input terminals for the unit 180. The terminal studs 194 as shown in FIGS. 4 and 5 are connected with the secondary windings 174B of the transformer 170 by conductors which have been designated by reference numeral 196. The conductors have the usual terminals fitted on studs 194 which are held in place by nuts 195. The connections are such as can be seen from FIGS. 4 and 5, that a conductor from a respective secondary winding 174B is commonly connected to one of the terminal studs 194 of the bridge rectifier unit 180.

Referring now to FIG. 3, it is seen that the housing 14 carries a terminal designated by reference numeral 206 connected to conductor 208. The conductor 208 in turn is connected with one of the terminal studs 78 and the terminal 206 provides a relay terminal for the generator which may be utilized to energize a relay or other electrical apparatus between A.C. input terminal 78 and ground.

The generator of this invention is air cooled and to this end a fan 209 is secured to the shaft 32 and is driven thereby. The fan 209 draws air out of the openings 12 formed in the end frame 10 and causes air to be pulled into the generator through the air inlet openings mentioned before. The shipping tube 210 is shown secured to the generator shaft 30 but it is to be understood that when the generator is installed in a motor vehicle a suitable pulley, not illustrated, will be secured to the shaft 24 to drive the shaft. The pulley is, of course, belt driven by the engine of the motor vehicle.

The operation of the dual voltage generator of this invention will now be described. In the use of the generator of this invention the generator is suitably supported by mounting brackets on the motor vehicle by bolts that pass through the openings formed in the bushings 212. The pulley of the generator, which is not illustrated, as mentioned hereinbefore, is belt driven by the engine of the motor vehicle.

The primary purpose of the generator of this invention, as has been described, is to provide two direct voltage outputs that are suitable for charging two equal terminal voltage storage batteries found on the motor vehicle. It will be evident from the circuit diagram of FIG. 5 that the output terminal 90 will provide a direct voltage between it and ground which is the proper voltage to charge the 12 volt storage battery designated by reference numeral 214 in FIG. 5. The storage battery 214 is the battery that is utilized on the motor vehicle to supply the normal electrical loads such as the headlights, accessories, etc., and these electrical loads have been designated by reference numeral 216. A conductor 218 connects the output terminal 90 to the positive side of battery 214 at junction 220. The conductor 218 also serves to supply the normal electrical loads on the vehicle whenever switch 222 is closed.

The other 12 volt storage battery is designated by reference numeral 224 and this battery is only used when it is desired to energize the cranking motor 227 for cranking the engine of the motor vehicle. The positive side of battery 224 is connected to the output terminal 190 of the generator by a conductor 226. The positive side of the storage battery 224 can be electrically connected to the cranking motor 226 whenever starter switch 228 is closed through conductor 230. It can be seen from FIG. 5 that the batteries 214 and 224 are connected in series by conductor 221 and that no switching device is required to electrically connect these batteries in series when it is desired to energize the cranking motor 226. It will also be appreciated that the auxiliary battery 224 is charged from a circuit that can be traced from output terminal 190, through conductor 226, through battery 224, through conductor 218 to heat sink 70A and then through conductor 184 to heat sink 180A which forms the negative terminal for the bridge rectifier 180.

In operation of this system, the voltage regulator 94 senses the voltage appearing between heat sink 70A and ground via conductor 118. This voltage is divided by resistors 152, 148 and 150 so that a voltage appears at junction 146 which is a function of the output voltage of bridge rectifier 70. Where the battery 214 is a 12 volt battery, the charging voltage for the battery is maintained at some voltage higher than this and the voltage regulator 94 performs this function. Thus, as the output voltage of the bridge rectifier 70 exceeds the desired regulated value, Zener diode 142 breaks down causing the transistor 132 to be forward biased. This causes the potential of the collector of transistor 132 to approach ground potential with the effect that transistors 126 and 128 are turned off. This reduces the output voltage of the generator 70 to a value such that the transistor 132 is biased off with the result that transistors 126 and 128 are biased on. The switching of transistors 126 and 128 between on and off conditions regulates the current flow through the field winding 42 such that a desired regulated voltage is developed by the alternating current generator and rectified by the rectifier 70 to charge battery 214 and to supply the electrical loads 216 on the motor vehicle.

As mentioned before, the turns ratio of the transformer 170 is substantially 1:1. However, in order to prevent overcharging the battery 224 it is preferred that the transformer slightly step-down the voltage between primary and secondary. Thus, it has been found that a turns ratio of 42 turns per primary phase to 41 turns per secondary phase or a step-down ratio of 42 to 41 provides a good charging characteristic for battery 224. This means that the charging voltage applied to battery 224 will be slightly less than the same voltage that is applied to battery 214 from the bridge rectifier 70 since the A.C. input voltage to the bridge rectifier 180 is slightly less (by a ratio of 41/42) than the magnitude of A.C. input voltage to the bridge rectifier 70. It therefore can be seen that the voltage regulator regulates the output voltage of the system by sensing the output voltage of bridge rectifier 70 but in so doing the output voltage of bridge rectifier 180 is also regulated to provide a proper charging voltage for the battery 224.

It will be appreciated by those skilled in the art that the transformer 170 serves to isolate the bridge rectifiers 70 and 180 from each other. If no transformer were provided it would be necessary to provide a switch to maintain the two charging circuits for the batteries 214 and 224 disconnected during battery charging. Thus, were the A.C. input terminals of the bridge rectifiers 70 and 180 both directly connected to the generator output winding 22, instead of a transformer connection bridge rectifier 180, the A.C. output windings of the generator would be shorted through a pair of series-connected diodes, one from each bridge rectifier during operation. This could be remedied by a circuit arrangement where conductor 70A is not connected to conductor 218 but rather is connected to the positive side of battery 214 by a separate conductor. This supposed circuit arrangement would require a switch connected between junction 220 and the point at which 70A is connected to the positive side of battery 214 by the separate conductor. This switch would be open during battery charging and closed during engine cranking. The transformer connection of this invention eliminates this switch and its associated wiring by preventing any shorting of generator winding 22.

In summary, it will be appreciated that the generator of this invention provides two direct output voltages for charging two batteries which are connected in series and which can be utilized to energize a cranking motor. Since all the components of the system are built into the generator it is only necessary to electrically connect the output terminals 190 and 90 to the batteries when it is desired to use the generator on a motor vehicle. It will be further appreciated that the generator of this invention completely eliminates a series-parallel switch or any other type of switch contactors for selectively connecting the batteries in parallel during charging and in series for energizing the cranking motor.

It will be appreciated by those skilled in the art that the frame parts of the generator of this invention are grounded and when the generator is supported in the vehicle a ground connection is made. If desired, however, the generator may be electrically connected to ground by a grounding strap which is connected to a grounding screw designated by reference numeral 234 which is threaded into a suitable threaded opening formed in the frame part 14.

The slitted rubber grommet 162, that receives conductors 160, is wedged between an inner wall of housing 14 and heat sink part 70A. This grommet serves to electrically insulate part 70A from housing 14, serves as an upper support for heat sink assembly 70 and also serves to support conductors 160.

The particular construction of bridge rectifier units 70 and 180 could take known forms other than the ones specifically disclosed herein as long as they are capable of being used as a part of the overall system disclosed herein.

What is claimed is:

1. An electrical system associated with an internal combustion engine comprising, a load battery having a predetermined voltage rating, a second auxiliary battery of like voltage rating, first, second and third terminals, means connecting said load battery between said first and second terminals, means connecting said auxiliary battery between said second and third terminals, a cranking motor circuit connected across said first and third terminals, an electrical load circuit connected across said first and second terminals, a polyphase alternating current generator having a polyphase output winding and a field winding, a polyphase rectifier having A.C. input terminals and two direct voltage output terminals, means connecting said input terminals of said polyphase rectifier to said output winding, said polyphase rectifier operable to rectify the polyphase output voltage generated in said output winding into a direct voltage appearing across the direct voltage output terminals of said polyphase rectifier, means connecting said two direct voltage output terminals of said polyphase rectifier respectively to said first and second terminals, a voltage regulator connected to sense the voltage across said load battery and across said direct voltage output terminals of said polyphase rectifier for controlling the energization of said field winding to thereby maintain the voltage across said load battery at a desired regulated value, an isolation transformer having primary and secondary windings, means connecting said primary winding of said isolation transformer to said output winding, a second rectifier having input terminals and two output terminals, means connecting said secondary winding of said isolation transformer to said input terminals of said second rectifier, means connecting said two ouutput terminals of said second rectifier to said second and third terminals, the turns ratio of said isolation transformer being such as to produce an open circuit average voltage at the output of said second rectifier substantially equal to 0.97 of the open circuit average voltage at the output of said polyphase rectifier.

2. An electrical system for charging a pair of series-connected batteries that are adapted to energize an electrical cranking motor circuit comprising, a first load battery, a second auxiliary battery of like voltage rating, first, second and third terminal means, means connecting said first load battery between said first and second terminal means, means connecting said auxiliary battery between said second and third terminal means whereby said batteries are connected in series additive relationship between said first and third terminal means, said first and third terminal means being adapted to supply a cranking motor circuit at a voltage equal to the series-additive voltages of said batteries, an alternating current generator having a three phase output winding and a field winding, a first three phase fullwave bridge rectifier having A.C. input terminals and direct voltage output terminals, means connecting said A.C. input terminals of said first bridge rectifier to said three phase output winding of said generator, means connecting said direct voltage output terminals of said first bridge rectifier with said first and second terminal means whereby said first load battery is charged thereby, a three phase transformer having primary and secondary windings, a second three phase full-wave bridge rectifier having A.C. input terminals and direct voltage output terminals, means connecting said primary winding of said transformer to said output winding, means connecting said secondary winding of said transformer to said A.C. input terminals of said second bridge rectifier, means connecting the direct voltage output terminals of said second bridge rectifier across said second and third terminal means whereby said second auxiliary battery is charged thereby, and a voltage regulator connected to said field winding and with the direct voltage output terminals of said first bridge rectifier, said voltage regulator controlling field current to control the magnitude of the voltage generated in said output winding to provide a desired regulated voltage at the output of said first bridge rectifier and across said first load battery in response to the voltage applied to said first load battery from the direct voltage output terminals of said first bridge rectifier, the ratio of secondary turns to primary turns of said transformer being substantially equal to 0.97 to thereby step-down the transformer input voltage.

* * * * *